United States Patent [19]

Ito

[11] Patent Number: 4,614,950
[45] Date of Patent: Sep. 30, 1986

[54] RECORDING APPARATUS CAPABLE OF PRECISELY POSITIONING A RECORDING SHEET

[75] Inventor: Yoshio Ito, Yokohama, Japan

[73] Assignee: Canon Kabushiki Kaisha, Tokyo, Japan

[21] Appl. No.: 654,105

[22] Filed: Sep. 24, 1984

[30] Foreign Application Priority Data

| Sep. 28, 1983 | [JP] | Japan | 58-179739 |
| Sep. 28, 1983 | [JP] | Japan | 58-179740 |
| Sep. 28, 1983 | [JP] | Japan | 58-179741 |
| Sep. 28, 1983 | [JP] | Japan | 58-179742 |
| Dec. 13, 1983 | [JP] | Japan | 58-233525 |
| Dec. 13, 1983 | [JP] | Japan | 58-233526 |

[51] Int. Cl.$^4$ ............................................. G01D 15/10
[52] U.S. Cl. ................................. 346/76 PH; 346/106; 346/134; 400/224.2
[58] Field of Search ............... 346/76 PH, 76 R, 106, 346/134; 219/216; 250/319; 400/120, 224.2, 240, 240.3, 240.4, 582, 583.4, 586, 587, 595, 596, 613.1, 614, 624, 625

[56] References Cited

U.S. PATENT DOCUMENTS

| 4,388,628 | 6/1983 | Moriguchi et al. | 346/76 PH |
| 4,404,568 | 9/1983 | Kikuchi et al. | 346/76 PH |

FOREIGN PATENT DOCUMENTS

| 0098033 | 4/1983 | European Pat. Off. | 400/240.3 |
| 57-84871 | 8/1983 | Japan | |
| 2117708 | 5/1985 | United Kingdom | 400/224.2 |

Primary Examiner—Art Evans
Attorney, Agent, or Firm—Fitzpatrick, Cella, Harper & Scinto

[57] ABSTRACT

A heat transfer recording apparatus comprises rotatable means for winding a recording sheet thereon, a transfer sheet having a layer of heat transfer material, guide means for winding the transfer sheet on the outer peripheral surface of the rotatable means with tension and guiding the recording sheet so that it is held by and between the rotatable means and the transfer sheet, means for applying heat to the transfer sheet wound on the rotatable means on the basis of recording information and effecting transfer recording on the recording sheet, and drive means for rotating the rotatable means in forward direction to cause recording to be effected by the recording means and rotating the rotatable means in reverse direction to discharge the recorded recording sheet.

39 Claims, 9 Drawing Figures

RECORDING APPARATUS CAPABLE OF PRECISELY POSITIONING A RECORDING SHEET

BACKGROUND OF THE INVENTION

1. Field of the Invention

This invention relates to a heat recording apparatus for applying heat to a transfer sheet carrying thereon, for example, a heat-meltable transfer material (heat-meltable ink) in accordance with image information to thereby accomplish transfer recording on a recording sheet.

2. Description of the Prior Art

Figure 1:
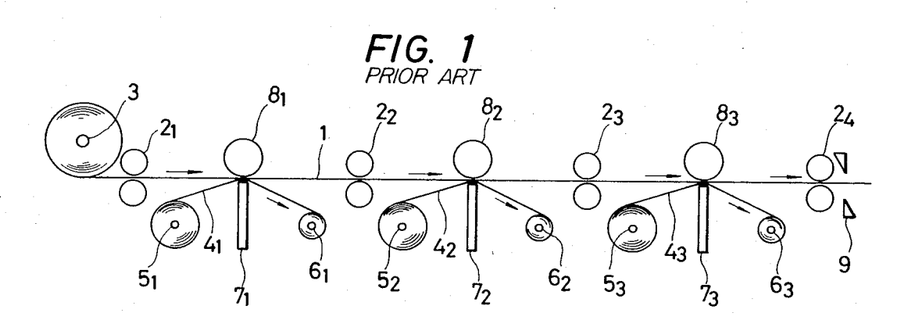
FIG. 1 is a schematic illustration of a color heat transfer recording apparatus according to the prior art.

Popular heat transfer recording apparatuses include a color recording apparatus such as is shown in FIG. 1 of the accompanying drawings.

In FIG. 1, reference numeral 1 designates a recording sheet paid away from a supply roll 3 and conveyed by pairs of rollers $2_1$–$2_4$. Reference numerals $4_1$, $4_2$ and $4_3$ denote heat transfer sheets to which heat transfer ink layers are applied. The sheet $4_1$ has a cyan heat transfer ink layer, the sheet $4_2$ has a magenta heat transfer ink layer, and the sheet $4_3$ has a yellow heat transfer ink layer. The heat transfer sheets are paid away from supply rolls $5_1$–$5_3$, respectively, and taken up by take-up rolls $6_1$–$6_3$, respectively. Reference numerals $7_1$, $7_2$ and $7_3$ designate thermal heads. The recording sheet and the heat transfer sheets are pressed between the thermal heads and platen rollers $8_1$, $8_2$, $8_3$.

When color recording by the three colors is to be effected, the head $7_1$ is first driven and cyan is heat-transferred to and recorded on the recording sheet on which cyan has been recorded is fed to the head $7_2$ and there magenta is heat-transferred and recorded while being superposed on the cyan ink, whereafter the area of the recording sheet on which there two colors have been recorded is fed to the head $7_3$ and there yellow is heat-transferred and recorded while being further superposed on the cyan and magenta inks. Thus, the area of the recording sheet on which recording has been completed is cut to a predetermined length by a cutter 9. When one head is being driven, the other two heads are put out of service.

In the apparatus of FIG. 1, the heat transfer sheets $4_1$–$4_3$ are taken up onto the take-up rolls $6_1$–$6_3$, respectively, by these rolls being driven, but if the rolls $6_1$–$6_3$ are strongly driven, conveyance of the heat transfer sheets $4_1$–$4_3$ will become unstable because the sheets $4_1$–$4_3$ are very thin, and this will particularly be so where the width of the sheets $4_1$–$4_3$ is great enough to cover paper of B5 or A4 size. For this reason, the sheets $4_1$–$4_3$ are moved by the friction force thereof with respect to the recording sheet 1 rather than by the tensile force of the rolls $6_1$–$6_3$ in the portions wherein the sheets $4_1$–$4_3$ bear against the heads $7_1$–$7_3$, respectively.

The apparatus of FIG. 1 suffers from the following problems. First, synchronized conveyance of the heat transfer sheets and the recording sheet resorts chiefly to the friction force between the sheets in the portions wherein they bear against the heads $7_1$–$7_3$ and therefore, the friction force is varied by the heat during the operation of the heads and slippage is liable to occur between the sheets. Also, dilation of the sheets is liable to occur due to the heat applied to the sheets by the heads $7_1$–$7_3$ or wrinkling of the thin heat transfer sheet is liable to occur due to contraction stress, and this is more conspicuous as the heat transfer sheets become wider enough to cover recording sheet of large size such as B5 or A4 size. All of these things deteriorate the quality of the image recorded on the recording sheet. Also, the sheets are separated from each other immediately after the heat transfer materials of the heat transfer sheets have been heated and melted by the heads $7_1$–$7_3$ and therefore, there is no sufficient time for the heat transfer materials to become attached to the recording sheet, and this also leads to unsatisfactory transfer From these facts, the apparatus of FIG. 1 is not suitable for high-speed recording.

On the other hand, there is an apparatus in which, unlike the apparatus of the above-described type, for example, the platen drum is provided with a pawl so that the leading end edge of a cut recording sheet is seized by the pawl and the recording sheet is wound on the platen drum and a heat generating head is urged against the thus wound recording sheet with a heat transfer sheet interposed therebetween to thereby accomplish heat transfer recording.

In such an apparatus, however, to automate the seizure of the recording sheet by the pawl, the mechanism is generally complicated, and this has led to bulkiness and increased cost of the apparatus.

Also, in the apparatuses according to the prior art, when multi-color superposition recording is to be effected on the recording sheet, it has been very difficult to accomplish the multi-color super-position recording accurately without misregistration.

SUMMARY OF THE INVENTION

It is an object of the present invention to provide a very suitable heat recording apparatus which can achieve simple and good recording.

It is another object of the present invention to provide a heat transfer recording apparatus of novel and simple construction in which recording is effected by forward rotation and discharge of recording sheets is effected by reverse rotation.

It is still another object of the present invention to decrease the number of guide members and thereby simplify the structure.

It is yet still another object of the present invention to effect recording at an accurate position on a recording sheet.

It is further object of the present invention to effect good recording without color misregistration when multi-color superposition recording is to be effected.

It is still a further object of the present invention to enable accurate alignment of a transfer sheet and a recording sheet.

It is yet still a further object of the present invention to prevent the transfer sheet from being injured.

It is a further object of the present invention to enable heat transfer recording to be accomplished by a highly reliable and simple construction.

Other objects of the present invention will become apparent from the following detailed description taken in conjunction with the accompanying drawings.

DESCRIPTION OF THE PREFERRED EMBODIMENTS

Figure 2:
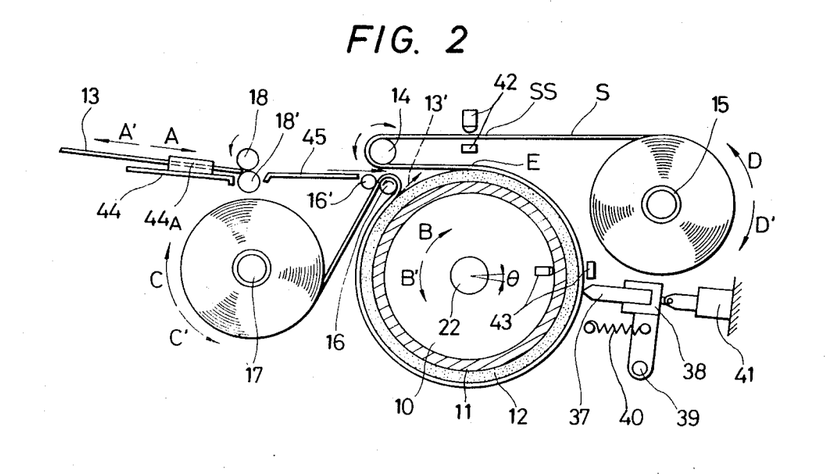
FIG. 2 is a cross-sectional view of a heat transfer recording apparatus according to a first embodiment of the present invention.

FIG. 2 shows a heat transfer recording apparatus which is a first embodiment of the present invention. In FIG. 2 reference numeral 10 designates a platen drum which is a pillar-like rotating means comprising a drum 11 of rigid material and an elastic material layer (preferably a heat-resisting rubber material) having a thickness of several millimeters provided on the peripheral surface of the drum 11. The circumferential length of the drum 10 is set to a value more or less greater than the length of a cut recording sheet (hereinafter referred to as the cut sheet) 13 on which recording is to be effected. Reference numeral 14 denotes a guide roller as a paper insertion guide member spaced apart by a predetermined distance from the outer peripheral surface of the platen drum 10 and disposed parallel to the center of rotation of the platen drum 10. This guide roller need not be rotated, but in the present embodiment, it is a roller having an axis of rotation parallel to the drum. A wide heat transfer sheet S having a color area of a length substantially equal to the length of the outer periphery of the platen drum 10 has one end thereof wound in a roll form on a supply shaft 15 and the other end drawn out and passed over the guide roller 14 and further wound on substantially on the whole outer peripheral surface of the platen drum 10, and then is passed over a small-diameter guide roller 16 as a guide member for continuously conveying the cut sheet 13 and is finally taken up by a take-up shaft 17. Accordingly, the guide rollers 14 and 16 serve to hold the heat transfer sheet S on the platen drum 10.

The take-up shaft 17 is rotated in a direction to take up the heat transfer sheet S, i.e., a direction C, by a motor, not shown, which comprises drive means, through a friction clutch, not shown, and on the other hand, the supply shaft 15 can also be rotated in a direction D′ by a motor, not shown, through a friction clutch, not shown, and at this time, the motor for the take-up shaft is not driven and the platen drum 10 is rotated in a direction B′ and the heat transfer sheet S is taken up by the supply roll.

Thus, the guide rollers 14 and 16 serve to wind the heat transfer sheet S substantially on the whole outer peripheral surface of the platen drum 10 with a moderate tension force as the heat transfer sheet is taken up from the supply roll to the take-up roll or from the take-up roll to the supply roll and, when the platen drum is rotated in a direction B or B′, the heat transfer sheet S also is conveyed by this rotation without slipping with respect to the platen drum 10. The ink layer on the heat transfer sheet S is directed in a direction for contacting the surface of the elastic material layer 12 of the platen drum 10 and, when the cut sheet 13 is conveyed in a direction A by paper feeding rollers 18 and 18′, the cut sheet 13 is held by and between the outer peripheral surface of the rotating platen drum 10 and the ink surface of the heat transfer sheet S with such a degree of intensity that does not cause slippage and is rotated and conveyed in the direction B together with the platen drum 10 by the rotation of the platen drum. When the platen drum 10 makes a little less than one full rotation in the direction B, the leading end edge of the cut sheet 13 peels off from the surface of the platen drum 10 as indicated at 13′ due to its own rigidity, and the guide roller 16 is provided in proximity to the inside of the guide roller 14 so that the peeled cut sheet 13 is again held by and between the heat transfer sheet S and the platen drum 10. The positions of the guide rollers 14 and 16 are determined so that the leading end edge of the peeled cut sheet 13 bears against the inner surface of the heat transfer sheet S between the guide roller 14 and a contact portion E at acute angle.

A roller 16′ is urged against the guide roller 16 so as to provide a pair of rollers which tightly hold the heat transfer sheet S therebetween and impart friction drive to the heat transfer sheet S to prevent slippage of the heat transfer sheet.

Figure 3:
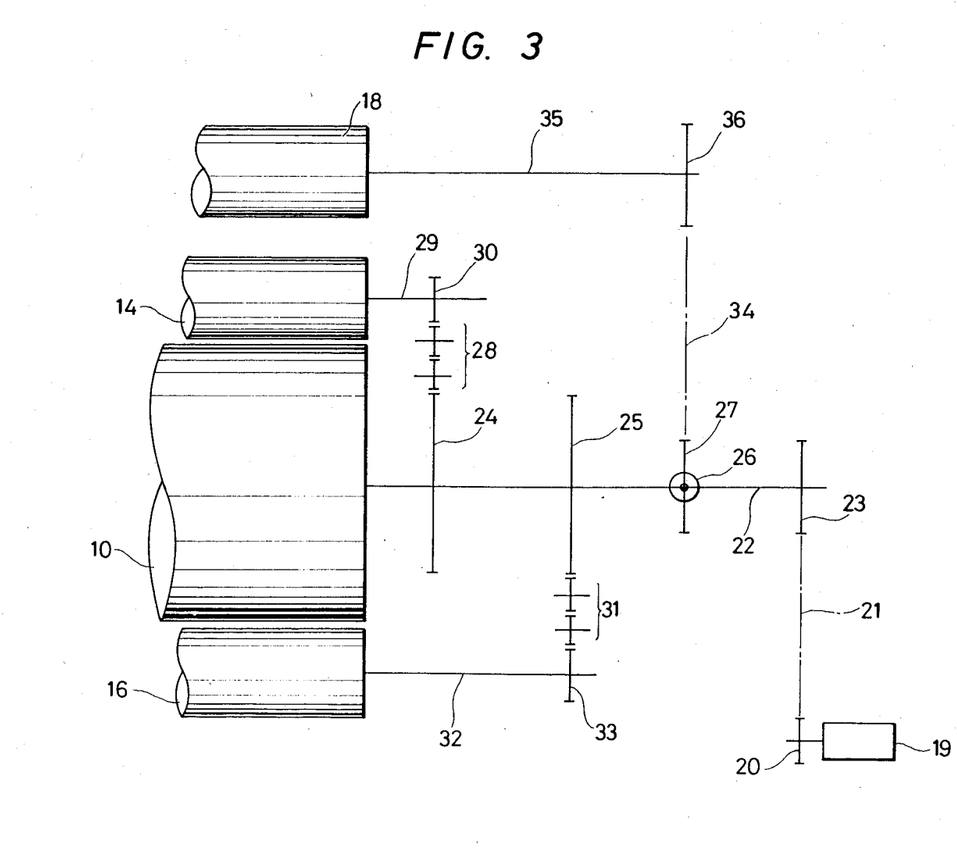
FIG. 3 is an illustration of a power transmitting mechanism.

FIG. 3 schematically shows the power transmitting system to the platen drum 10, the guide rollers 14, 16 and the paper feeding roller 18. All of these rollers are reversibly rotatively driven by a reversible pulse motor 19 which is drive source. A gear 20 fixed to the output shaft of the pulse motor 19 is in mesh engagement with a gear 23 fixed to the rotary shaft 22 of the platen drum 10 through a gear train 21. Thus, the platen drum 10 is rotated in forward direction (direction B in FIG. 2) and reverse direction (direction B′) in response to the forward revolution and reverse revolution of the pulse motor 19. Gears 24 and 25 are coaxially fixed to the rotary shaft 22 of the platen drum 10, and a gear 27 is mounted on the rotary shaft 22 through a clutch 26 capable of transmitting a torque in both directions and capable of arbitrarily intercepting the transmission of power by a solenoid or the like, not shown. A gear 30 fixed to the rotary shaft 29 of the guide roller 14 is in mesh engagement with the gear 24 through a gear train 28 and in FIG. 2, the guide roller 14 is rotated in the direction opposite to the direction of rotation of the platen drum 10 at just the same peripheral speed as that of the platen drum 10. Also, the gear 25 is in mesh engagement with a gear 33 fixed to the rotary shaft 32 of the guide roller 16 through a gear train 31, and the guide roller 16 is rotated in the direction opposite to the direction of rotation of the platen drum 10 as viewed in FIG. 2 at the same peripheral speed as that of the platen drum. Further, the gear 27 is in mesh engagement with a gear 36 fixed to the rotary shaft 35 of the paper feeding roller 18 through a gear train 34. The paper feeding roller 18 also is rotated in the direction opposite to the direction of rotation of the platen drum 10 at the same peripheral speed as that of the platen drum.

It is apparent that when the pulse motor 19 is rotated from forward direction to reverse direction, the platen drum 10 and the rollers 14, 16, 18 are rotated in the direction opposite to their direction of rotation hitherto at the same peripheral speed, but the relation to the direction of rotation of the platen drum 10 does not vary.

As described above, relative to the platen drum 10 and the rollers 14, 16, 18 having the same peripheral speed, the rotational speeds of the take-up shaft 17 and the supply shaft 15 are originally varied by the amount of winding of the heat transfer sheet S. This is because the motors which rotate the shafts 17 and 15 are revolving always at an equal speed or are stopped. More particularly, when the pulse motor 19 is revolving in forward direction and the platen drum 10 is rotating in the direction B, the motor on the take-up shaft side is rotating so that the peripheral speed of the take-up shaft 17 itself is somewhat higher than the peripheral speed of the platen drum 10, and the peripheral speed of the take-up roll including the heat transfer sheet S wound on the take-up shaft 17 is much greater than the peripheral speed of the platen drum, but the take-up shaft 17 slips due to a friction clutch and absorbs this speed difference and imparts moderate tension to the heat transfer sheet S. Also, at this time, the motor on the supply shaft 15 side is stopped and back tension is applied to the heat transfer sheet S through the friction clutch. On the other hand, when the pulse motor 19 is revolving in reverse direction and the platen drum 10 is rotating in the direction B', the motor on the supply shaft 15 side is revolving in a direction D' so that the peripheral speed of the supply shaft 15 itself is somewhat higher than the peripheral speed of the platen drum 10, and as described previously, the friction clutch absorbs the speed difference. Also, at this time, the motor on the take-up shaft 17 side is stopped and back tension is imparted to the heat transfer sheet S. By such a construction, even when the pulse motor 19 revolves in any direction, moderate tension is always imparted to the heat transfer sheet S and the sheet S is well taken up without slack.

The supply shaft 15 is rotated in the direction D' and the amount of take-up of the heat transfer sheet S is small and therefore, the supply shaft 15 may be provided with a slip mechanism endowed with a spring charging function capable of creating a rotational force in the direction D' and, when the platen drum 10 is rotating in the direction B, back tension may be applied to the heat transfer sheet S and the heat transfer sheet may be taken up in the direction D' by a spring force stored at this time.

On the other hand, the heat transfer sheet S comprises a base such as polyester film or condenser paper and a solid ink layer of thickness of 1-3 μm applied to the base, the solid ink layer having carnauba wax, ester wax or pigment as a component and heat-meltable at the order of 70°-90° C., and a heat-sublimation dye can of course be used.

Figures 4, 5:
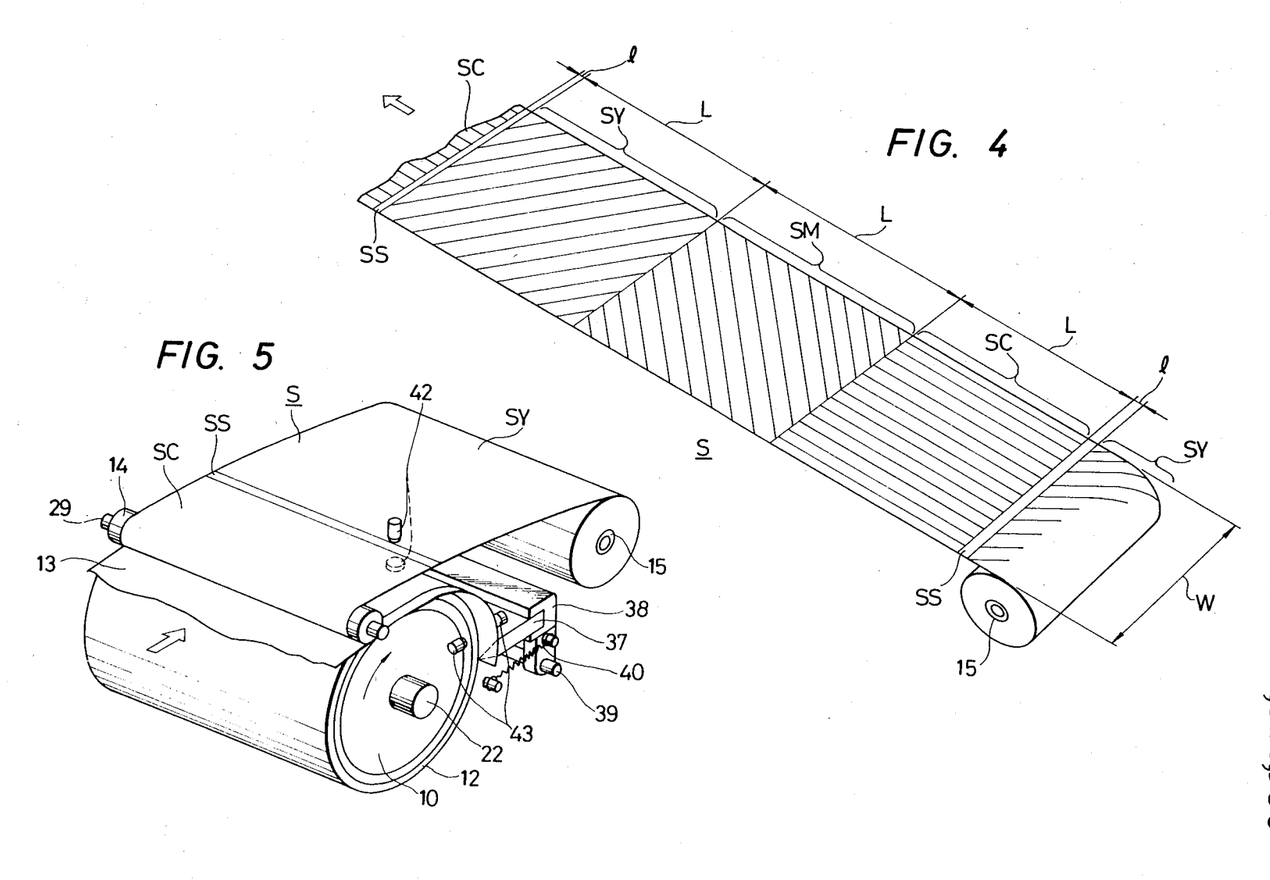
FIG. 4 is a perspective view of a heat transfer sheet.
FIG. 5 is a perspective view of the first embodiment as seen obliquely from above it.

The heat transfer sheet S taken up on the supply shaft 15, as shown in FIG. 4, is regularly painted into three color units of yellow SY, magenta SM and cyan SC in the direction of conveyance, and the color areas SY, SM and SC are sectioned lengthwisely at a length substantially equal to the outer peripheral dimension L of the platen drum 10. Also, transparent stripes SS of a width l are formed as color area discriminating portion so that a discrimination signal can be taken for each three-color unit. The width W of the heat transfer sheet S is substantially equal to the width of the platen drum 10 and incidentally, the widths of the guide rollers 14 and 16 are greater than W so that the heat transfer sheet S can be conveyed stably.

In the present embodiment, the heat transfer sheet S is of three colors, i.e., yellow, cyan and magenta, but this can be changed as desired, by adding black, white or the like. Also, the transparent stripes SS as the color area discriminating portions may be replaced with black stripes or reflecting stripes such as silver foil.

Turning back to FIG. 2, a thermal head 37 as heat application means or recording means is disposed adjacent to the outside of the plate drum 10 on which the heat transfer sheet S is wound. This thermal head 37 has minute heat-generating resistance members linearly arranged at the fore end thereof in a direction parallel to the rotary shaft 22 of the platen drum and over a width substantially equal to or somewhat narrower than the width of the platen drum 10, and constitutes a so-called full multi-type thermal head. The thermal head 37 is integrally fixed to a holding member 38 which in turn is rotatably held on a shaft 39 fixed in parallelism to the rotary shaft 22 of the platen drum, and further is biased by a spring 40 and urged against the platen drum 10 with the heat transfer sheet S interposed therebetween. On the other hand, a plunger 41, mounted to pull the thermal head 37 apart from the platen drum 10 is fixed to the holding member 38, and by drive-controlling this plunger 41, the thermal head 37 can be selectively brought into contact with and away from the heat transfer sheet S on the platen drum.

Reference numeral 42 designates a detector comprising a light-emitting lamp and a light-receiving element for detecting the stripes SS of the heat transfer sheet and knowing the position of the color area of the heat transfer sheet S. The position of this detector 42 is set to a position at which the distance from this position to a point E at which the platen drum 10 contacts the heat transfer sheet S is equal to the distance from the paper feeding rollers 18, 18' to the point E. Accordingly, when the platen drum 10 is rotated in the direction B and the take-up shaft 17 also is rotated in the take-up direction (the direction C) to convey the heat transfer sheet S toward the take-up shaft 17, the detector 42 detects the stripe SS of the heat transfer sheet S and energizes the clutch 26 to rotate the paper feeding rollers 18, 18' and if the cut sheet 13 is conveyed in the direction A, the leading end edge of the cut sheet 13 becomes coincident with the stripe SS of the heat transfer sheet S and with this relative relation maintained, the cut sheet 13 is wound on the platen drum 10 by the heat transfer sheet S and is conveyed in the direction B. Also, this detector 42 is provided at the right end of the heat transfer sheet S, as shown in FIG. 5. The right end position of the heat transfer sheet S is a surplus zone outside the recording range so that, as will later be described, the ink-free portion which is the used portion of the heat transfer sheet S never appears in front of the detector 42 when the platen drum 10 is rotated in the opposite direction (the direction B') to discharge the cut sheet 13. Thus, the detector 42 does not detect, as the stripe SS, the ink-free portion in which ink has been stripped by erroneous recording during the discharge of the cut sheet, but always detects the stripe SS and thereby can stop the pulse motor 19 and further can stop the rotation of the supply shaft 15 and take-up shaft 17, thus terminating the recording operation.

Reference numeral 43 designates a sheet end detector for directly detecting the leading end of the cut sheet wound on the platen drum 10 by the heat transfer sheet S. The detector 43 comprises a combination of a light-emitting element and a light-receiving element. The thermal head 37 can effect recording accurately on a predetermined position on the end sheet on the basis of the detection by the detector 43. The sheet end detector 43 is fixed at a location on the side of the platen drum 10 which is a little deviated toward the rotary shaft 22. This is for the purpose of detecting the end portion of the cut sheet 13 slightly projected rightwardly from the right end of the platen drum 10, thereby detecting the leading end edge of the cut sheet 13. In order to convey the cut sheet 13 toward the platen drum 10 so that the ear portion of the cut sheet 13 slightly projects from the right end of the platen drum 10, a control portion 44A is formed at the right end of a paper guide 44, as shown in FIG. 2. Accordingly, by feeding the cut sheet 13 toward the paper feeding rollers 18, 18' so that the right end thereof contacts the control portion 44A, the cut sheet is wound always at a proper position relative to the platen drum 10. The paper guide 45 assumes a linear shape to smoothly feed the cut sheet 13 into a portion in which the heat transfer sheet S begins to contact the platen drum 10, and is provided substantially in parallelism to the heat transfer sheet between the guide roller 14 and the platen drum 10. Also, the sheet end detector 43 is provided toward the guide roller 14 by an angle $\theta$ from the recording position of the thermal head 37, as shown in FIG. 2. Thus, the thermal head 37 can effect recording substantially from the leading end portion of the cut sheet.

The operation of the present embodiment comprising the above-described construction will now be described while complementing the construction of the embodiment.

First, when a recording command is put out from the control circuit, not shown, of the present recording apparatus, the pulse motor 19 begins to revolve in forward direction, whereby the platen drum 10 is rotated in the direction B and the guide rollers 14 and 16 are also rotated at the same peripheral speed as that of the platen drum. At this time, however, the clutch 26 is in OFF state and the paper feeding rollers 18 and 18' remain stopped, and the cut sheet 13 stands by with its right end in contact with the control portion 44A and its leading end edge seized between the paper feeding rollers 18 and 18'. Also, in synchronism with the rotation of the platen drum 10 in the direction B, the motor on the take-up shaft 17 side starts to revolve and takes up the heat transfer sheet S while imparting tension thereto. At this time, the motor on the supply shaft 15 side remains stopped and imparts back tension to the heat transfer sheet S. In the manner described above, the unused heat transfer sheet S is unwound from the supply roll and conveyed with the platen drum 10 and further taken up onto the take-up roll. Also, at this time, the thermal head 37 is urged against the platen drum 10 with the heat transfer sheet S interposed therebetween, by the force of the spring 40.

When the transparent stripe SS which is the color area indicating portion of the sheet S comes to the front of the first detector 42 due to the above-described conveyance of the heat transfer sheet, the detector 42 puts out a detection signal. When this detection signal is produced, the clutch 26 assumes its ON state in synchronism therewith and the paper feeding rollers 18 and 18' start to rotate, thus conveying the cut sheet 13 in the direction A. The feed speed of the cut sheet 13 is equal to the conveyance speed of the heat transfer sheet S, and the transparent stripe SS and the leading end edge of the cut sheet 13 become coincident with each other at the point E and in this state, the cut sheet 13 is wound onto the platen drum with moderate tension by the heat transfer sheet S.

Thus, in the present embodiment, the color area discriminating portion of the heat transfer sheet S is detected to thereby determine the timing at which the cut sheet 13 is fed and therefore, the leading end edge of the cut sheet 13 and the color area discriminating portion of the heat transfer sheet S are always coincident with each other. In contrast, heretofore, for example, a heat transfer sheet having a plurality of color area has been conveyed relative to the cut sheet on the platen drum and the color areas have been successively opposed to the cut sheet, and this has been repeated to accomplish color superposition recording, but when such recording has been continued, the dimensional error has accumulated and misregistration has occurred between the color areas of the cut sheet and the heat transfer sheet and thus, recording has become impossible. Therefore, the heat transfer sheet has been shifted relative to the cut sheet and correction has been made so that the color areas of the heat transfer sheet become properly opposed to the cut sheet. However, this has been very difficult and has required an expensive mechanism. According to the present embodiment, such disadvantage of the prior art can be overcome by a very simple construction.

Now, in the manner described above, the heat transfer sheet S, the cut sheet 13 and the platen drum 10 are rotatively conveyed together in the direction B without slipping. When the platen drum 10 rotates by about 90° from the point E, the ear portion of the cut sheet 13 projecting from the right end of the platen drum 10 arrives at the front of the second detector 43. Thus, the detector 43 produces a detection signal resulting from the detection of the leading end edge of the cut sheet 13.

After the revolution of the pulse motor 19 (platen drum 10) by an amount corresponding to N pulses (angle $\theta$) after the production of the leading end detection signal, the thermal head 37 is driven to generate heat in accordance with an image information signal sent from the control circuit. In the meantime, the pulse motor 19 continues to revolve at a predetermined speed and recording of the first color (yellow) is continuously effected. When the cut sheet 13 is wound on the platen drum 10, the clutch 26 assumes its OFF state and the paper feeding rollers 18 and 18' are stopped.

Figure 6:
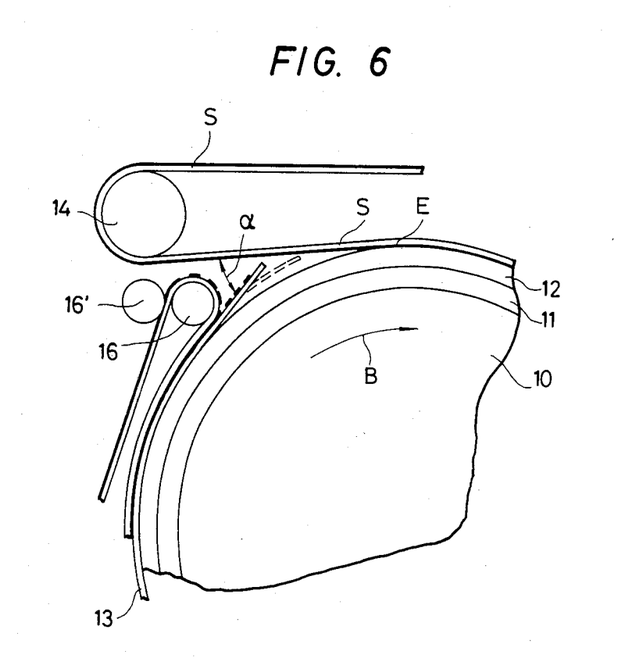
FIG. 6 illustates the process in which a peeled cut sheet is again wound on a platen drum.

When the platen drum 10 rotates by about 300° in the direction B from the point E, the leading end edge of the cut sheet 13 peels off from the platen drum 10 as shown in FIG. 6. This is because the cut sheet 13 is not pressed against the platen drum 10 by the heat transfer sheet S, and by further rotation of the platen drum 10 in the direction B, the leading end edge of the cut sheet 13 bears against the heat transfer sheet S between the guide roller 14 and the point E at an acute angle $\alpha$. Thereafter, the leading end edge of the cut sheet 13 has its direction of movement gradually changed to the horizontal direction by conveyance of the heat transfer sheet S and is again held by and between the platen drum 10 and the heat transfer sheet S. When the leading end edge of the cut sheet 13 separates from the surface of the platen drum 10 and again arrives at the point E, the whole surface of the cut sheet substantially snugly comes into contact with the surface of the platen drum 10 due to its own rigidity, and the initial positions of the platen drum and the leading end edge of the cut sheet are kept and never deviate from each other. The thicker the paper, the more stable is this contact. However, if the paper is relatively thin, the whole surface of the cut sheet will not completely contact the surface of the platen drum but may somewhat separate from the surface of the platen drum, and at a time whereat the leading end edge of the cut sheet has arrived at the point E in the portion of contact between the platen drum 10 and the heat transfer sheet S, the leading end edge of the heat transfer sheet S is maintained in a parallel relation to the axis of rotation of the platen drum 10 and no problem such as bending occurs.

Thus, in the present embodiment, the cut sheet 13 is again wound on the platen drum 10 by its own rigidity and therefore, it is not necessary to provide a guide roller or a guide plate on the peripheral surface of the platen drum and the entire apparatus can be constructed simply and compactly.

Now, from the time at which the leading end edge of the cut sheet 13 arrives at the point E, the leading end portion of the cut sheet 13 shifts to a second rotation, and the boundary of the second color of the heat transfer sheet S colored at a length substantially equal to the circumferential length of the platen drum becomes coincident with the leading end edge of the cut sheet 13, and the cut sheet 13 proceeds to the detector 43 while advancing, whereupon the detector 43 produces a second cut sheet leading end detection signal. Here it is important that, as described in connection with thin paper, when there is some floatage of the cut sheet 13 from the drum 10, the position of the cut sheet on the surface of the drum becomes delayed by a minute dimension which is a by-pass dimension Δl which can be found from the dimension of an arcuate space, and the position of the platen drum 10 is detected and a second color image information signal is not imparted to the thermal head 37, but in the present embodiment, after the detection of the leading end edge of the cut sheet 13, an image information signal is imparted after the rotative conveyance by N pulses and therefore, the second color image information is completely coincident with the first color image information. Likewise, rotation and transfer for each color are repeated to thereby effect three-color superposition recording and thus, color transfer recording is terminated.

Thus, in the present embodiment, before recording of each color is effected, the leading end edge of the cut sheet 13 is detected without fail, and recording of each color is effected on the basis of the detection signal and therefore, even if the cut sheet is deviated relative to the platen drum, recording can be accomplished at an accurate position on the cut sheet and, when color superposition recording is to be effected, good recording free of color misregistration can be accomplished.

Now, after the platen drum 10 has made the third rotation and the detector 43 has detected the leading end edge of the cut sheet 13 three times, color superposition recording for the third color is effected on the cut sheet 13 and, when the platen drum further rotates and the fourth cut sheet leading end detection signal is produced by the detector 43, the control circuit detects completion of the recording and revolves the pulse motor 19 in reverse direction. Simultaneously therewith, the plunger 41 is energized to pivotally move the thermal head 37 and pulls it apart from the platen drum 10. Also, at the same time, the motor on the take-up shaft 17 side is stopped and instead, the motor on the supply shaft 15 side starts to revolve in the direction D' and takes up the heat transfer sheet S. Further, in synchronism therewith, the clutch 26 assumes its ON state and the paper feeding rollers 18 and 18' start to rotate in a direction to discharge the recorded cut sheet 13 in the direction A'. By such reverse rotation of each portion, the recorded cut sheet 13 is rotatively conveyed in the direction B' while being wound on the platen drum 10 and is peeled off from the heat transfer sheet S at the point E from the trailing end edge thereof, and is now discharged in the opposite direction from the same place as that at which it has been inserted. The cut sheet 13 thus discharged is guided by the guide 45 and arrives at the paper feeding rollers 18 and 18', whereby it is further conveyed in the direction A'.

Thus, according to the present embodiment, the platen drum, etc. are rotated in reverse direction, whereby the recorded cut sheet is peeled off from the heat transfer sheet S and is discharged from the place at which it has been inserted and therefore, for example, a separating pawl which has heretofore been necessary, a solenoid for operating such separating pawl, and other mechanism exclusively for use for discharging are not required, and the structure can be very much simplified.

Now, discharging of the recorded cut sheet 13 is accomplished by reverse rotation of the various portions including the platen drum 10 and, when the cut sheet 13 has been discharged, the transparent stripe SS of the heat transfer sheet S arrives at the front of the detector 42. This stripe SS corresponds to the next color area discriminating portion of the stripe SS previously detected when recording has been started, and the portion of the heat transfer sheet S which is nearer the take-up shaft 17 than this stripe SS is used for the present recording and the portion of the heat transfer sheet S which is nearer the supply shaft 15 than this stripe SS is unused. Now, when the transparent stripe SS is detected by the detector 42, the control circuit further revolves the pulse motor 19 by an amount corresponding to M steps, whereafter it stops the pulse motor and also stops the motor on the supply shaft 15 side, thus completing the recording operation. It is for the purpose of completely separating the cut sheet 13 from the paper feeding rollers 18 and 18' that the pulse motor is further revolved in reverse direction by an amount corresponding to M pulses after the detector 42 has detected the stripe SS. When recording it is be again effected, the above-described recording operation may be repeated.

Thus, according to the present embodiment, when the cut sheet is to be discharged, the heat transfer sheet S is conveyed in reverse direction and the transparent stripe SS is detected to stop all portions and therefore, at a point of time whereat all portions have been stopped, a transparent stripe which is the next color area indicating portion is positioned substantially in front of the detector 42 and, when the next recording is to be effected, operation can shift to the recording substantially in that state and for example, the procedure of reversely conveying the heat transfer sheet can be omitted, and thus the construction is very much simplified.

Also, in the present embodiment, all position timing controls are effected by the two detectors 42 and 43 and in this respect, the construction is very much simplified.

Figure 7:
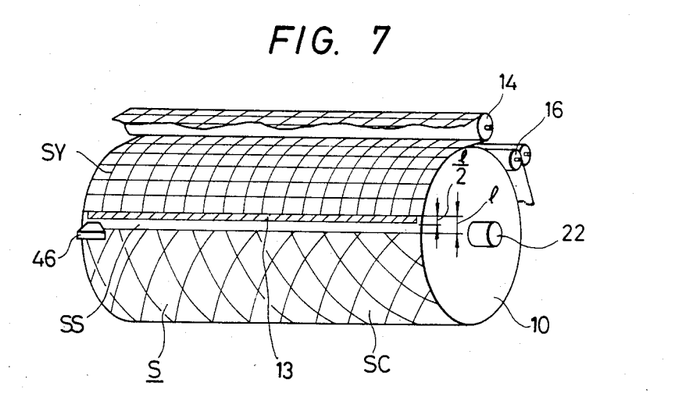
FIG. 7 is a perspective view of a part of a second embodiment of the present invention.

FIG. 7 shows a second embodiment of the present invention. In this embodiment, a reflection type photosensor 46 is used as the detector for detecting the leading end edge of the cut sheet 13. This photosensor 46, like the detector 43, is provided in the end portion non-recording zone of the heat transfer sheet S. Portions which are not shown in FIG. 7 are similar to those of the first embodiment and need not be described. In the present embodiment, the width of the cut sheet 13 is equal to or somewhat smaller than the width of the platen drum 10. Also, in the present embodiment, as compared with the first embodiment, the fixed position of the detector 42 is set at a position ½l nearer the guide roller 14. Thus, when the cut sheet 13 has been wound on the platen drum 10, the leading end edge of the cut sheet 13 is positioned substantially centrally of the transparent stripe SS (having a width l) of the heat transfer sheet S. Thereby the detector 46 can detect the leading end edge of the cut sheet 13 through the transparent stripe SS and it becomes unnecessary to cause the end portion of the cut sheet to project like an ear from the platen drum 10. In the present embodiment, the cut sheet 13 is white or the like and the platen drum is black. Accordingly, the detector 46 is at 0 level for the color areas SY, SM and SC of the heat transfer sheet S and the platen drum surface below the transparent stripe SS, but at "1" level for the cut sheet 13 below the transparent stripe SS, and can reliably detect the leading end edge of the cut sheet 13.

The present invention is not restricted to the above-described embodiments. For example, the detectors 43 and 46, in addition to detecting the leading end edge of the cut sheet, may detect termination of three-color superposition recording and produce a timing signal for reversely rotating the platen drum, etc. and accordingly, it may detect the trailing end edge of the cut sheet after termination of the third color recording and reversely rotate the platen drum, etc. Also, reverse rotation may be started by the third color image information recording termination signal provided from the control circuit, and any other method may be adopted. The heat application means is not limited to the thermal head, but may be any means which will melt the ink on the heat transfer sheet by application of a laser beam thereto and effect recording.

Figure 8:
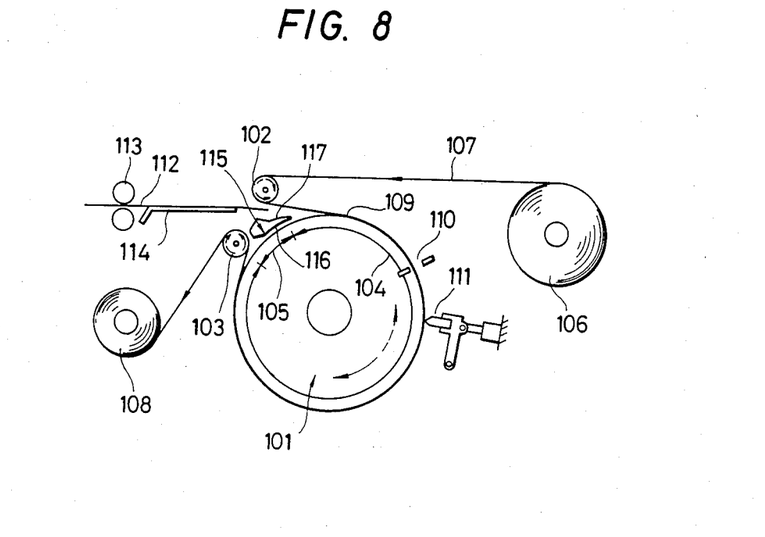
FIG. 8 is a cross-sectional view of a third embodiment of the present invention.

FIG. 8 shows a third embodiment of the present invention. In FIG. 8, an inlet guide roller 102 and an outlet guide roller 103 are provided at a predetermined interval, i.e., with a recording sheet feeding-discharging gap, adjacent to the peripheral surface of a pillar-like platen drum 101 which is rotatable means. The peripheral surface of the platen drum 101 is divided into a recording area 104 substantially approximate to the entire periphery and a supply-discharge area 105 by these guide rollers 102 and 103.

The platen drum 101 and the guide rollers 102, 103 are rotatively driven in forward direction (recording direction) indicated by solid line arrow and reverse direction (discharging direction) indicated by dot-and-dash line arrow, respectively, by a step motor.

A wide ink donor sheet 107 paid away from an ink donor sheet supply roll 106 is changed in direction by the inlet guide roller 102 and is wound on the recording area 104 of the platen drum 101, and is fed out while being in intimate contact with the peripheral surface thereof, and is paid away from the outlet guide roller 103 and is taken up onto an ink donor sheet take-up roll 108. This ink donor sheet is a heat transfer sheet having a layer of heat transfer material on a sheet.

Reference numeral 109 designates a position at which in the recording area 104, the ink doner sheet 107 begins to contact the peripheral surface of the platen drum 101, and a detector 110 for detecting the leading end edge of the recording sheet and a thermal head 111 which is recording means are provided in the recording area.

Recording sheets (cut sheets) 112 piled in a paper supply cassette (not shown) are fed out one by one by a paper feeding roller (not shown) and, after the recording sheet thus fed out stands by with the leading end edge thereof being in contact with a pair of timing rollers 113, this pair of rollers 113 are driven at a predetermined timing, whereby the recording sheet is supplied onto the peripheral surface of the platen drum 101 through a guide plate 114. The recording sheet 112 thus supplied is held by and between the platen drum 101 and the ink doner sheet 107 and is fed synchronously.

The ink doner sheet 107 is a film sheet wide enough to cover the recording range of each recording sheet 112, and the lengths of the platen drum 101 and the guide rollers 102, 103 are somewhat greater than the width of the ink donor sheet 107.

A layer of transfer, ink is provided on one surface of the ink donor sheet 107, i.e., that surface which contacts the recording sheet 112. This layer of transfer ink is formed by a continuous layer of black ink in the case of a sheet for monochrome (black only), and is formed by a layer in which a plurality of color inks (for example, cyan, magenta and yellow) are repetitively arranged in a predetermined order for each predetermined length (for example, the circumferential length of the platen drum 101), in the case of a sheet for colors.

Also, the thermal head 111 is designed to transfer an image by applying heat to the back of the ink donor sheet for each line with a pattern corresponding to the image information, and, is driven to a position spaced apart from the ink donor sheet during the other operations than recording, such as paper feeding and the like.

A guide member 115 is disposed in proximity to the peripheral surface of the supply-discharge area 105 of the platen drum 101. This guide member 115 is formed with a guide surface 116 for holding down the lift of the leading end edge of the recording sheet 112 passing through the recording area 104 and further fed forward and for gradually guiding the leading end edge toward the peripheral surface of the platen drum at the inlet portion of the recording area 104. As shown, the fore end portion of the guide surface 116 lies at a position as proximate as possible to the peripheral surface of the platen drum, and by this guide surface, the guide member can guide the relatively rigid recording sheet 112 along the peripheral surface of the platen drum and thus, can prevent the collision of the leading end, edge of the recording sheet 112 against the ink donor sheet 107 and prevent dilation and wrinkling of the weak ink donor sheet 107. Also, the onter surface 117 of the guide member 115 can be utilized as a guide surface during the supply and discharge of the recording sheet 112 by suitably choosing the shape thereof. The width of the guide member 115 is chosen to a dimension great enough to cover the whole width of the recording sheet 112.

The operation and effect of the recording apparatus shown in FIG. 8 will hereinafter be described.

In the case of monochromatic recording, recording is completed during the time that a recording sheet 112 is supplied and the platen drum 101 makes one full rotation, and the completion of the recording is detected to rotate the platen drum 101 and the guide rollers 102, 103 in reverse direction (the direction of dot-and-dash line arrow) and the recording sheet 112 is discharged outwardly from the supply-discharge area 105, namely, from between the guide member 115 and the inlet guide roller 102. Again in the monochromatic recording, there is a case where the leading end edge of the recording sheet is fed into the recording area when the last line is recorded on the recording sheet, but even in that case, the collision of the leading, end edge of the recording sheet 112 against the ink donor sheet 107 can be prevented by the guide member 115 and dilation and wrinkling of the ink doner sheet 107 can be effectively prevented. Also, the feeding of the recording sheet 112 can be effected smoothly.

In the case of color recording, after a recording sheet 112 has been supplied, a first color is transferred during the first rotation of the platen drum 101 and a second color is superposedly transferred during the second rotation of the platen drum, and such transfer is repeated plural times while the driving in forward direction (recording direction) is continued. After the color recording has been terminated, the platen drum 101 and the guide rollers 102, 103 are rotated in reverse direction and the recording sheet 112 is taken out.

In the case of such color recording, the recording sheet 112 is rotated plural times in forward direction, and again in this case, similarly to the operation in the previously described case, the leading end edge of the recording sheet is guided by the guide surface of the guide member 115 and the collision thereof against the ink donor sheet 107 is effectively prevented. Accordingly, accurate recording can be easily accomplished even in the color recording which requires high accuracy in the alignment of the recording sheet 112 and the ink doner sheet 107 with the thermal head 111.

Thus, not only in monochromatic recording but also in color recording, a fine and accurate recording operation can be executed easily.

Figure 9:
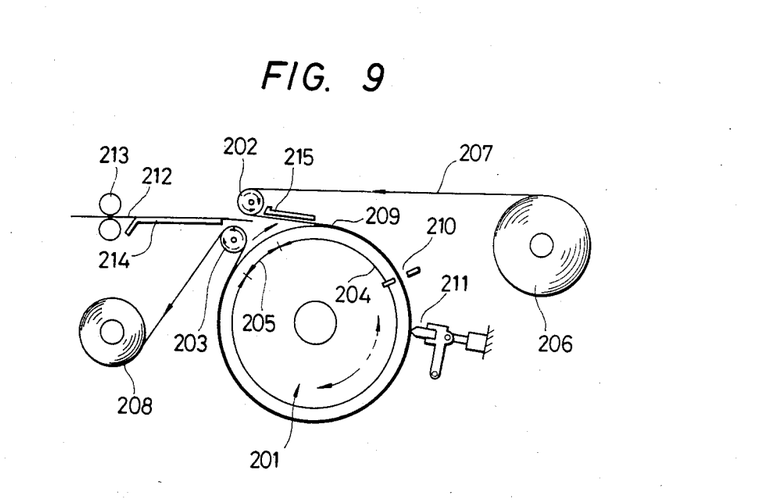
FIG. 9 is a cross-sectional view of a fourth embodiment of the present invention.

FIG. 9 shows a fourth embodiment of the present invention. In FIG. 9, an inlet guide roller 202 and an outlet guide roller 203 are provided at a predetermined interval, i.e., with a recording sheet feeding-discharging gap, adjacent to the peripheral surface of a pillar-like platen drum 201 which is rotatable means. The peripheral surface of the platen drum 201 is divided into a recording area 204 substantially approximate to the entire periphery and a supply-discharge area 205 by these guide rollers 202 and 203.

The platen drum 201 and the guide rollers 202, 203 are rotatively driven in forward direction (recording direction) indicated by solid line arrow and reverse direction (discharging direction) indicated by dot-and-dash line arrow, respectively, by a step motor.

An ink donor sheet 207 which is a wide transfer sheet paid away from an ink donor sheet supply roll 206 is changed in direction by the inlet guide roller 202 and is wound on the recording area 204 of the platen drum 202, and is fed out while being in intimate contact with the peripheral surface thereof, and is paid away from the outlet guide roller 203 and is taken up onto an ink donor sheet take-up roller 208.

The position 209 in the recordin,g area 204 indicates a position at which the ink donor sheet 207 begins to contact the peripheral surface of the platen drum, and a detector 210 for detecting the leading end edge of the recording sheet and a thermal head 211 which is recording means are provided in this recording area.

Recording sheets (cut sheets) 212 piled in a paper supply cassette (not shown) are fed out one by one by a paper feeding roller (not shown) and, after the recording sheet thus fed out stands by with the leading end edge thereof being in contact with a pair of timing rollers 213, the pair of rollers 213 are driven at a predetermined timing, whereby the recording sheet is supplied onto the peripheral surface of the platen drum 201 through a guide plate 214. The recording sheet 212 is,held by and between the platen drum 201 and the ink donor sheet 207 and is fed synchronously.

The ink donor sheet 207 is of a width great enough to cover the recording range of the recording sheet 212, and the lengths of the platen drum 201 and the guide rollers 202, 203 are somewhat greater than the width of the ink donor sheet.

A layer of transfer, ink is provided on one surface of the ink donor sheet 207, i.e., that surface which contacts the recording sheet 212. This layer of transfer ink is formed by a continuous black layer in the case of a sheet for monochrome (black only), and is formed by a layer in which a plurality of color inks (for example, cyan, magenta and yellow) are repetitively arranged in a predetermined order for each predetermined length (the circumferential length of the platen drum), in the case of a sheet for colors.

Also, the thermal head 211 is designed to transfer an image by applying heat to the back of the ink donor sheet for each line with a pattern corresponding to the image information, ,and is driven so as to become spaced apart from the ink donor sheet during the other operations than the recording operation, such as paper feeding and the like.

A guide plate 215 which is guide means is provided behind the ink donor sheet 207 between the inlet guide roller 202 and the contact starting position 209. This guide plate 215 has a width great enough to cover substantially the whole width of the ink donor sheet 207.

The guide plate 215, as shown, slidably contacts the back of the ink donor sheet 207 and guides and supports this ink donor sheet, and is disposed at a position whereat the leading end edge of the recording sheet 212 raised from the peripheral surface of the platen drum in the supply-discharge area 205 contacts or collides against the platen drum when the recording sheet 212 having passed through the recording area 204 is further conveyed in forward direction and again fed into the recording area. Also, the cross-section of the guide plate 215 is of such a shape that the leading end edge of the recording sheet 212 which contacts or collides against the platen drum is gradually changed in direction and is guided toward the peripheral surface of the platen drum 201.

The operation and effect of the heat transfer recording apparatus shown in FIG. 9 will hereinafter be described.

In the case of monochromatic recording, recording is terminated during the time that a recording sheet 212 is supplied and the platen drum 201 makes one full rotation, and, after the termination of the recording has been detected, the platen drum 201 and the guide rollers 202, 203 are rotated in reverse direction and the recording sheet 212 is discharged outwardly from the supply-discharge area 205. Again in the monochromatic recording, there is a case where when the last line is to be recorded, the leading end edge of the recording sheet 212 comes into the recording area through the guide plate 215 and contacts or collides against the ink donor sheet 207, but the ink doner sheet 207 is guided and supported by the guide plate 215 and therefore, dilation and wrinkling of the ink doner sheet can be prevented. Also, the leading end edge of the recording sheet 212 is guided to the peripheral surface of the platen drum by the guide plate 215 and therefore, conveyance of the recording sheet can be accomplished smoothly.

In the case of color transfer, after a recording sheet 212 has been supplied, a first color is transferred during the first rotation of the platen drum 201 and a second color is superposedly transferred during the second rotation of the platen drum, and these transfers are repeated predetermined times while driving in forward direction (recording direction) is continued and thus, color recording is terminated, whereafter the platen drum is rotated in a direction indicated by dot-and-dash line arrow and the recording sheet 212 is discharged outwardly.

In such color recording, the leading end edge of the recording sheet 212 contacts or collides against the ink donor sheet 207 plural times in the area of the guide plate 215, but since as in the previously described case, the ink donor sheet 207 is guided and supported from the back thereof by the guide plate 215, dilation and wrinkling of the ink donor sheet can be effectively prevented. Repetitive supply of the recording sheet 212 can also be effected smoothly.

Thus, not only in monochromatic recording but also in multi-color recording, a fine and accurate recording operation can be accomplished easily.

The present invention is not restricted to the above-described embodiments, but may be applied, for example, to a copying apparatus which effects electrostatic image recording. In this case, the platen drum 10 is replaced with a so-called photosensitive drum, and the detector 46 shown in FIG. 7 is made into a reflection type photointerrupter using an infrared ray so that the photosensitive drum may not be exposed to light, and further, use may preferably be made of a photointerrupter of sharp directionality. If, in a copying apparatus, design is made such that the leading end position of the recording sheet wound on the photosensitive drum is detected by the use of a reflection type photointerrupter, the misregistration between color images which it has heretofore been very difficult to eliminate will be eliminated and a copying apparatus which can obtain sharp color copies free of misregistration will become possible.

The recording medium used with the present invention may be not only so-called cut sheets but also a roll of uncut paper or fan-fold paper, and the term "recording sheets" used herein includes both of cut paper and uncut paper.

What is claim is:

1. A recording apparatus for recording on a cut recording sheet an image corresponding to image information, comprising:
    a rotating member;
    guide means for guiding and transporting an elongated transfer sheet, having transfer materials for recording an image on the recording sheet by transferring them onto the recording sheet, wherein the transfer sheet extends essentially completely around said rotating member such that the cut recording sheet is pinched between said rotating member and the transfer sheet when conveyed plural times around said rotating member in the same direction; and
    recording means for recording the image corresponding to the image information on the cut recording sheet, said recordinging means being disposed at a position where it opposes said rotating member along the conveyance path of the recording sheet which is conveyed while pinched between said rotating member and the transfer sheet.

2. An apparatus according to claim 1, wherein the peripheral length of said rotating member is qqual to or longer than the length of the cut recording sheet with respect to the conveyance direction.

3. An apparatus according to claim 1, wherein the transfer sheet is wound around a periphery of said rotating member under tension.

4. An appartus according to claim 1, wherein said recording means included a thermal head.

5. An apparatus according to claim 1, wherein a width of said transfer sheet is substantially equal to the width of said rotating member.

6. An apparatus according to claim 1, wherein the transfer sheet includes a plurality of thermal transfer material areas of various colors which are aligned in the conveyance direction, and said rotating member is rotated plural times in one direction to effect multi-color recording on the recording sheet and thereafter is rotated in the reverse direction to discharge the recording sheet.

7. An apparatus according to claim 1, wherein said rotating member and said guide means are driven by a common drive source.

8. An appartus according to claim 1, wherein said guide means guides the transfer sheet such that when said rotating member rotates once, the edge of the recording sheet released from said rotating member contacts the transfer sheet at an acute angle, and thereafter the second rotation of the recording sheet is executed.

9. An apparatus according to claim 1, wherein the recording sheet projects from a side end of said rotating member with respect to an axis thereof, and the projecting end is directly detected by detecting means to detect a position of the recording sheet.

10. An apparatus according to claim 1, further comprising recording sheet guide means for guiding the recording sheet such that when said rotating member rotates in a normal direction for recording, the recording sheet is kept in contact with said rotating member, and when said rotating member rotates in a reverse direction for discharging, the recording sheet is separated from said rotating member.

11. An apparatus according to claim 1, further comprising a guide plate displosed at an entrance passed by an advancing edge of the recording sheet advancing toward the location where said rotating member and the transfer sheet come into contact.

12. An apparatus according to claim 1, wherein the transfer sheet is successively fed from a supply roll and taken up around a winding roll.

13. An apparatus according to claim 1, where said guide means includes a pair of guide rollers.

14. An apparatus according to claim 13, wherein said rotating member includes a platen drum and said pair of rollers are driven by a drive source common to said palten drum.

15. An apparatus according to claim 14, wherein the peripheral speed of one of said rollers is lower than the peripheral speed of said platen drum and the peripheral speed of the other said roller is greater than the peripheral speed of said platen drum.

16. A recording apparatus for recording on a cut recording sheet an image corresponding to image information, comprising:
    a rotating member;
    guide means for guiding and transporting an elongated transfer sheet, having transfer materials for recording an image on the recording sheet by transferring them onto the recording sheet, wherein the transfer sheet extends essentially completely around said rotating member such that the cut recording sheet is pinched between said rotating member and the transfer sheet when conveyed plural times around said rotating member in the same direction;

recording means for recording the image corresponding to the image information on the cut recording sheet, said recording means being disposed at a position where it opposes said rotating member along the conveyance path of the recording sheet which is conveyed while pinched between said rotating member and the transfer sheet; and driving means for rotating said rotating member in a reverse direction relative to the direction of the plural rotations thereof after a predetermined number of rotations so as to discharge the cut recording sheet on which the image has been recorded.

17. An apparatus according to claim 16, wherein the peripheral length of said rotating member is equal to or longer than the length of the cut recording sheet with respect to the conveyance direction.

18. An apparatus according to claim 16, wherein the transfer sheet is wound around a periphery of the rotating member under tension.

19. An apparatus according to claim 16, wherein said recording means includes a thermal head.

20. An apparatus according to claim 16, wherein the width of the transfer sheet is substantially equal to the width of said rotating member.

21. An apparatus according to claim 16, wherein said rotating member and said guide means are driven by a common drive source.

22. An apparatus according to claim 16, wherein said guide means guides the transfer sheet such that when said rotating member rotates once, the edge of the recording sheet released from said rotating member contacts the transfer sheet at an acute angle, and thereafter the second rotation of the recording sheet is executed.

23. An apparatus according to claim 16, wherein the recording sheet projects from a side end of said rotating member with respect to an axis thereof, and the projected end is directly detected by detecting means to detect a position of the recording sheet.

24. An apparatus according to claim 23, wherein said detecting means detects the leading and trailing edges of the recording sheet.

25. An apparatus according to claim 16, further comprising recording sheet guide means for guiding the recording sheet such that when said rotating member rotates in a normal direction for recording, the recordiUg sheet is kept in contact with said rotating member, and when said rotating member rotates in a reverse direction for discharging, the recording sheet is separated from said rotating member.

26. An apparatus according to claim 16, further comprising a guide plate disposed at an entrance passed by an advancing edge of the recording sheet advancing toward the location where said rotating member and the transfer sheet contact.

27. An apparatus according to claim 16, wherein the transfer sheet is successively fed from a supply roll and taken up around a winding roll.

28. A recording apparatus for recording on a cut recording sheet an image corresponding to image information, comprising:

a rotating member;

guide means for guiding and transporting an elongated transfer sheet, having transfer materials of plural colors aligned in the transport direction, wherein the transfer sheet extends essentially completely around said rotating member such that the cut recording sheet is pinched between said rotating member and the transfer sheet when conveyed plural times around said rotating member in the same direction;

detecting means for detecting a boundary between colors of the transfer materials on the transfer sheet; and feed means for deeding the recording sheet to the pinching portion between said rotating member and the transfer sheet in accordance with the detection by said detecting means so that the recording sheet is conveyed while a predetermined position of the recording sheet is located relateive to a predetermined position of the transfer sheet.

29. An apparatus according to claim 28, wherein the peripheral length of said rotating member is equal to or longer than the length of the cut recording sheet with respect to the conveyance direction.

30. An apparatus according to claim 28, wherein the transfer sheet is wound around a periphery of the rotating member under tension.

31. An apparatus according to claim 28, wherein said recording means includes a thermal head.

32. An apparatus according to claim 28, wherein the width of the transfer sheet is substantially equal to the width of said rotating member.

33. An apparatus according to claim 28, wherein the transfer sheet includes a plurality of thermal transfer material area of carious colors which are aligned in the conveyance direction, and said rotating member is rotated plural times in one direction to effect multi-color recording on the recording sheet and thereafter is rotated in the reverse direction to discharge the recording sheet.

34. An apparatus according to claim 28, wherein said rotating member and said guide means are driven by a common drive source.

35. An apparatus according to claim 28, wherein said guide means guides the transfer sheet such that when said rotating member rotates once, the edge of the recording sheet released from said rotating member contacts the transfer sheet at an acute angle, and thereafter the second rotation of the recording sheet is executed.

36. An apparatus according to claim 28, wherein the recording sheet projects from a side end of said rotating member with respect to an axis thereof, and the projecting end is directly detected by detecting means to detect a position of the recording sheet.

37. An apparatus according to claim 28, further comprising recording sheet guide means for guiding the recording sheet such that when said rotating member rotates in a normal direction for recording, the recording sheet is kept in contact with said rotating member, and when said rotating member rotates in a reverse direction for discharging, the recording sheet is separated from said rotating member.

38. An apparatus according to claim 28, further comprising a guide plate disposed at an entrance passed by an advancing edge of the recording sheet advancing toward the location where said rotating member and the transfer sheet contact.

39. An apparatus according to claim 28, wherein the transfer sheet is sucessively fed from a supply roll and taken up around a winding roll.

* * * * *

UNITED STATES PATENT AND TRADEMARK OFFICE
CERTIFICATE OF CORRECTION

PATENT NO. : 4,614,950

DATED : September 30, 1986

INVENTOR(S) : YOSHITO ITO

Page 1 of 2

It is certified that error appears in the above-identified patent and that said Letters Patent is hereby corrected as shown below:

Column 2, line 2, change "deteribrate" to --deteriorate--;
         line 9, after "transfer" insert --.--;
         line 29, change "super-position" to --superposition--; and
         line 47, after "is" insert --a--.

Column 3, line 40, delete "on" (second occurrence).

Column 5, line 58, change "portion" to --portions--.

Column 12, line 45, after "end" delete --,--.

Column 13, line 2, after "leading" delete --,--; and
         line 55, change "recordin,g" to --recording--.

Column 14, line 2, delete ",";
         line 9, delete ","; and
         line 22, delete "," (second occurrence).

Column 15, line 47, change "is" to --I--; (1st occurr.) and
         line 64, change "recordinging" to --recording--.

Column 16, line 2, change "qqual" to --equal--;
         line 8, change "appartus" to --apparatus--;
         line 24, change "appartus" to --apparatus--; and
         line 43, change "parted" to --parated--.

UNITED STATES PATENT AND TRADEMARK OFFICE
CERTIFICATE OF CORRECTION

PATENT NO. : 4,614,950

DATED : September 30, 1986

INVENTOR(S) : YOSHITO ITO

It is certified that error appears in the above-identified patent and that said Letters Patent is hereby corrected as shown below:

Column 17, line 53, change "diUg" to --ding--; and
          line 56, change "parted" to --parated--.

Column 18, line 12, change "deeding" to --feeding--;
          line 17, change "relateive" to --relative--;
          line 32, change "carious" to --various--; and
          line 59, change "parted" to --parated--.

Signed and Sealed this

Thirteenth Day of January, 1987

Attest:

DONALD J. QUIGG

Attesting Officer     Commissioner of Patents and Trademarks